(12) United States Patent
Belin et al.

(10) Patent No.: US 10,214,638 B2
(45) Date of Patent: Feb. 26, 2019

(54) RUBBER COMPOSITION COMPRISING AN AROMATIC DICYCLOPENTADIENE RESIN

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Cecile Belin, Clermont-Ferrand (FR); Olivier Goncalves, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 0 days.

(21) Appl. No.: 15/301,380

(22) PCT Filed: Apr. 2, 2015

(86) PCT No.: PCT/EP2015/057366
§ 371 (c)(1),
(2) Date: Oct. 1, 2016

(87) PCT Pub. No.: WO2015/150542
PCT Pub. Date: Oct. 8, 2015

(65) Prior Publication Data
US 2017/0121509 A1    May 4, 2017

(30) Foreign Application Priority Data
Apr. 3, 2014 (FR) ...................... 14 52952

(51) Int. Cl.
| | | |
|---|---|---|
| *C08L 9/06* | (2006.01) | |
| *B60C 1/00* | (2006.01) | |
| *C08K 3/04* | (2006.01) | |
| *C08L 57/02* | (2006.01) | |
| *C08K 5/00* | (2006.01) | |

(52) U.S. Cl.
CPC .............. *C08L 9/06* (2013.01); *B60C 1/0016* (2013.01); *C08K 3/04* (2013.01); *C08L 57/02* (2013.01); *C08K 5/0016* (2013.01); *C08L 2205/03* (2013.01)

(58) Field of Classification Search
None
See application file for complete search history.

(56) References Cited

U.S. PATENT DOCUMENTS

| | | |
|---|---|---|
| 3,919,130 A | 11/1975 | Cohen |
| 4,012,344 A | 3/1977 | Cohen |
| 2015/0259516 A1* | 9/2015 | Mathey ..................... C08L 7/00 523/156 |

FOREIGN PATENT DOCUMENTS

| | | | |
|---|---|---|---|
| EP | 1077229 A1 | 2/2001 | |
| JP | 2009155526 A | 7/2009 | |
| WO | WO-2014016340 A1 * | 1/2014 | ................ C08L 7/00 |

OTHER PUBLICATIONS

Soney et al., "Permeation of nitrogen and oxygen gases through styrene-butadiene rubber, natural rubber, and styrene-butadiene rubber/natural rubber blend membranes," Euro. Poly. J., 37 (2001), pp. 183-191. (Year: 2001).*

* cited by examiner

*Primary Examiner* — Catherine S Branch
(74) *Attorney, Agent, or Firm* — Dickinson Wright PLLC

(57) ABSTRACT

The disclosure relates to a rubber composition based on at least one styrene/butadiene copolymer SBR, the SBR having a content of greater than or equal to 50 parts per hundred parts of elastomer, phr, a reinforcing filler comprising predominantly carbon black with a CTAB specific surface area of greater than or equal to 90 $m^2/g$, wherein the composition comprises an aromatic dicyclopentadiene plasticizing resin comprising essentially styrene, ethylene and dicyclopentadiene units, at a content ranging from 2 to 40 phr, the composition containing less than 5 phr of another plasticizer.

20 Claims, No Drawings

RUBBER COMPOSITION COMPRISING AN AROMATIC DICYCLOPENTADIENE RESIN

CROSS-REFERENCE TO RELATED APPLICATIONS

The present invention claims priority to PCT International Patent Application Serial No. PCT/EP2015/057366 filed Apr. 2, 2015 entitled "Rubber Composition Comprising An Aromatic Dicyclopentadiene Resin," which claims the benefit of FR Patent Application Serial No. 1452952 filed Apr. 3, 2014, the entire disclosures of the applications being considered part of the disclosure of this application and hereby incorporated by reference.

BACKGROUND OF THE INVENTION

1. Field of the Invention

The present disclosure relates to diene rubber compositions reinforced by an organic filler, intended for the manufacture of tires or semi-finished products for tires, especially for the treads of these tires, in particular used for civil engineering.

2. Related Art

It is constantly being sought to improve the properties of tires, especially those used for civil engineering, in particular the wear resistance thereof.

Such an improvement is generally obtained by using finer reinforcing fillers in the tread, or by increasing the content of reinforcing fillers.

Unfortunately, irrespective of the solution adopted, this causes real difficulties, in particular for very large civil engineering tires. This is because the increase in the content of reinforcing fillers leads to problems of significant internal heating of the reinforcing belt, which may lead to self-combustion of the mixture and degradation of the tire.

Moreover, the use of finer reinforcing fillers requires the use of plasticizers in order to overcome the difficulties of workability or processability of such fillers. However, the presence of plasticizers in these compositions causes a degradation of some mechanical properties of the compositions, such as the limit properties (deformation, breaking energy).

SUMMARY OF THE INVENTION AND ADVANTAGES

The applicant has discovered, surprisingly, that the use of fine reinforcing fillers combined with a specific type of plasticizing resin made it possible to overcome all the drawbacks mentioned above.

Thus, a subject of the disclosure is a rubber composition based on at least one styrene/butadiene copolymer SBR, the SBR having a content of greater than or equal to 50 parts per hundred parts of elastomer, phr, a reinforcing filler comprising predominantly carbon black with a CTAB specific surface area of greater than or equal to 90 m$^2$/g, wherein the composition comprises an aromatic dicyclopentadiene plasticizing resin comprising essentially styrene, ethylene and dicyclopentadiene units, at a content ranging from 2 to 40 phr, the composition containing less than 5 phr of another plasticizer.

Preferably, the SBR content of the rubber composition ranges from 60 to 100 phr and more preferentially from 80 phr to 100 phr.

According to one embodiment of the disclosure, the SBR is used in a blend with at least one other diene elastomer, in particular selected from the group consisting of polybutadienes, synthetic polyisoprenes, natural rubber, butadiene copolymers, isoprene copolymers and the mixtures of these elastomers, and more particularly with natural rubber or synthetic polyisoprene.

Preferentially, the carbon black present in the rubber composition represents more than 60% by weight of the sum total of reinforcing filler, and more preferentially still more than 90% by weight of the sum total of reinforcing filler.

Advantageously, the aromatic dicyclopentadiene plasticizing resin comprises at least 90% by weight of units selected from styrene, ethylene and dicyclopentadiene units.

The disclosure also relates to a tire comprising a rubber composition as described above, and also a tread comprising a rubber composition as described above.

I. Measurements and Tests Used

The rubber compositions are characterized after curing, as indicated below.

Tensile Tests

These tests make it possible to determine the elasticity stresses and the properties at break; those carried out on cured mixtures are carried out in accordance with standard AFNOR-NF-T46-002 of September 1988.

At a temperature of 100° C.-2° C., and under standard hygrometry conditions (50-5% relative humidity), according to French standard NF T 40-101 (December 1979), the stresses at break (in MPa) are measured and the elongations at break (in %) are also measured, the energy at break (breaking energy) being the product of the stress at break and the elongation at break.

Tearability

The tearability indices are measured at 100° C. The force to be exerted in order to obtain breaking (FRD, in MPa (in N/mm)) is especially determined and the strain at break (DRD, in %) is measured on a test specimen with dimensions of 10×85×2.5 mm notched at the centre of its length with 3 notches over a depth of 5 mm, in order to bring about breaking of the test specimen. Thus, the energy for bringing about breaking (energy) of the test specimen, which is the product of the FRD and DRD, can be determined.

DETAILED DESCRIPTION OF THE ENABLING EMBODIMENTS

The present disclosure relates to a rubber composition based on at least one styrene/butadiene copolymer SBR, the SBR having a content of greater than or equal to 50 parts per hundred parts of elastomer, phr, a reinforcing filler comprising predominantly carbon black with a CTAB specific surface area of greater than or equal to 90 m$^2$/g, wherein the composition comprises an aromatic dicyclopentadiene plasticizing resin comprising essentially styrene, ethylene and dicyclopentadiene units, at a content ranging from 2 to 40 phr, the composition containing less than 5 phr of another plasticizer.

The expression composition "based on" should be understood as meaning a composition comprising the mixture and/or the reaction product of the various constituents used, some of these base constituents being capable of reacting or intended to react with one another, at least in part, during the various phases of manufacturing the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Diene Elastomer

The term "diene" elastomer (or, equally, rubber), whether natural or synthetic, should be understood in a known way to mean an elastomer consisting at least in part (i.e., a homopolymer or a copolymer) of diene monomer units (monomers bearing two conjugated or non-conjugated carbon-carbon double bonds).

These diene elastomers can be classified into two categories: "essentially unsaturated" or "essentially saturated". Generally, the term "essentially unsaturated" is understood to mean a diene elastomer resulting at least in part from conjugated diene monomers having a content of units of diene origin (conjugated dienes) which is greater than 15% (mol %); thus, diene elastomers such as butyl rubbers or copolymers of dienes and α-olefins of EPDM type do not come under the preceding definition and can especially be classed as "essentially saturated" diene elastomers (low or very low content, always less than 15%, of units of diene origin). Within the "essentially unsaturated" category of diene elastomers a "highly unsaturated" diene elastomer is in particular understood to mean a diene elastomer having a content of units of diene origin (conjugated dienes) which is higher than 50%.

Given these definitions, "diene elastomer capable of being used in the compositions in accordance with the disclosure" is understood more particularly to mean:

(a) any homopolymer of a conjugated diene monomer, especially any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, those skilled in the art of tires will understand that the present disclosure is preferably employed with essentially unsaturated diene elastomers, in particular of the above type (a) or (b).

The elastomer matrix of the composition in accordance with the disclosure comprises at least one SBR with a content of greater than or equal to 50, preferably with a content ranging from 60 to 100 phr, more preferentially from 80 to 100 phr.

It may advantageously be used in a blend with one or more other diene elastomers, especially selected from the group consisting of polybutadienes, synthetic polyisoprenes, natural rubber, butadiene copolymers, isoprene copolymers and the mixtures of these elastomers.

In particular, the SBR may be used in a blend with natural rubber or a synthetic polyisoprene, present at a content ranging from 1 to 40 phr and preferentially ranging from 5 to 25 phr.

The abovementioned elastomers may have any microstructure, which depends on the polymerization conditions used, especially on the presence or absence of a modifying and/or randomizing agent and on the amounts of modifying and/or randomizing agent employed. The elastomers may, for example, be block, random, sequential or microsequential elastomers and may be prepared in dispersion or in solution; they may be coupled and/or star-branched or else functionalized with a coupling and/or star-branching or functionalization agent. For coupling to carbon black, mention may for example be made of functional groups comprising a C—Sn bond or aminated functional groups, such as aminobenzophenone, for example; for coupling to a reinforcing inorganic filler such as silica, mention may for example be made of silanol functional groups or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or U.S. 2006/0089445) or else polyether groups (such as described, for example, in EP 1 127 909 or U.S. Pat. No. 6,503,973, WO 2009/000750 and WO 2009/000752).

As functional elastomers, mention may also be made of those prepared using a functional initiator, especially those bearing an amine or tin functional group (see, for example, WO 2010/072761).

As other examples of functionalized elastomers, mention may also be made of elastomers (such as SBR, BR, NR or IR) of the epoxidized type.

It will be noted that the SBR may be prepared as emulsion (ESBR) or as solution (SSBR).

Whether it is ESBR or SSBR, use is especially made of an SBR having a moderate styrene content, for example of between 10% and 35% by weight, or a high styrene content, for example from 35% to 55%, a content of vinyl bonds of the butadiene part of between 15% and 70%, a content (mol %) of trans-1,4-bonds of between 15% and 75% and a Tg of between −10° C. and −65° C., preferably of greater than or equal to −50° C.

The composition according to the disclosure may contain one or more synthetic elastomers other than diene elastomers, or even with polymers other than elastomers, for example thermoplastic polymers.

Reinforcing Filler

In the present description, the CTAB specific surface area is determined according to French Standard NF T 45-007 of November 1987 (method B).

The composition of the disclosure comprises at least one reinforcing filler comprising predominantly, that is to say at a content of greater than or equal to 50% by weight, so-called "fine" carbon black, that is to say having a CTAB specific surface area of greater than or equal to 90 m$^2$/g.

Among the latter, mention will more particularly be made of the reinforcing carbon blacks of the 100 or 200 series (ASTM grade), such as, for example, the N115, N134 or N234 blacks.

Of course, a blend of two carbon blacks having the abovementioned features is suitable for the disclosure.

Blacks having a "low" structure, that is to say having a COAN number of less than 95 ml/g, may also be suitable.

It will be noted that the oil absorption number of compressed samples of carbon black (COAN) is a measure of the ability of the carbon black to absorb liquids. This property is itself a function of the structure of the carbon black. The COAN number is determined using standard ISO 4656/2012 using an absorptometer with compressed samples of carbon black.

It will be noted that the carbon blacks may for example be already incorporated in the SBR, or the NR where appropriate, especially isoprene-based, in the form of a masterbatch produced by dry or liquid route (see, for example, applications WO 97/36724 or WO 99/16600).

This carbon black advantageously constitutes more than 60% by weight of the total reinforcing filler, preferably more than 70% and even more preferentially 90% by weight of the total reinforcing filler of the composition.

The carbon black may advantageously represent the only reinforcing filler of the composition.

According to one embodiment variant of the disclosure, the carbon black having the abovementioned CTAB specific surface area may be used in a blend with another reinforcing filler, in a minor amount, preferentially at a content of between 1 and 10 phr. This other reinforcing filler may consist of any type of reinforcing filler known for its abilities to reinforce a rubber composition which can be used for the manufacture of tires.

For example, another organic filler such as another carbon black, functionalized polyvinylaromatic organic fillers such as those described in applications WO-A-2006/069792 and WO-A-2006/069793, a reinforcing inorganic filler such as silica, with which a coupling agent is combined, in a known way, or else a mixture of these different fillers.

Thus, the term "inorganic filler" should be understood here to mean, in a known way, any inorganic or mineral filler, irrespective of its colour and its origin (natural or synthetic), also known as "white filler", "clear filler" or also "non-black filler", in contrast to carbon black, this inorganic filler being capable of reinforcing, by itself, without means other than an intermediate coupling agent, a rubber composition intended for the manufacture of a tire tread, in other words capable of replacing, in its reinforcing role, a conventional tire-grade carbon black for a tread. Such a filler is generally characterized by the presence of functional groups, especially hydroxyl (OH) functional groups, at its surface, requiring, in order to be used as reinforcing filler, the use of a coupling agent or system intended to provide a stable chemical bond between the isoprene elastomer and said filler.

Such an inorganic filler may thus be used with a coupling agent in order to enable the reinforcement of the rubber composition in which it is included. It may also be used with a covering agent (which does not provide a bond between the filler and the elastomeric matrix), in addition to a coupling agent or not (in this case, the inorganic filler does not act as reinforcement).

The physical state in which the inorganic filler is provided is not important, whether it is in the form of a powder, micropearls, granules, beads or any other appropriate densified form. Of course, the term "inorganic filler" is also understood to mean mixtures of various inorganic fillers, in particular of highly dispersible siliceous and/or aluminous fillers, as described below.

Mineral fillers of the siliceous type, in particular silica ($SiO_2$), or of the aluminous type, in particular alumina ($Al_2O_3$), are suitable in particular as inorganic fillers. The silica used may be any silica known to those skilled in the art, especially any precipitated or fumed silica exhibiting a BET surface area and a CTAB surface area which are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

The BET specific surface area is determined in a known way by gas adsorption using the Brunauer-Emmett-Teller method described in The Journal of the American Chemical Society, Vol. 60, page 309, February 1938, more specifically, according to French Standard NF ISO 9277 of December 1996 (multipoint (5 point) volumetric method—gas: nitrogen—degassing: 1 hour at 160° C.—relative pressure p/po range: 0.05 to 0.17).

It is also possible to envisage the addition, to the specific carbon black of the composition, of other fillers in a minor amount, preferably at a content of less than or equal to 10 phr, such as carbon blacks partially or completely covered with silica via a post-treatment or the carbon blacks modified in situ by silica, such as, nonlimitingly, the fillers sold by Cabot Corporation under the name Ecoblack™ CRX 2000 or CRX 4000.

Preferentially, the total content of filler (carbon black and other fillers, where appropriate) is between 20 and 150 phr, and more preferentially between 20 and 100 phr. The carbon black according to the disclosure is present at a content ranging from 20 to 90 phr, more preferentially from 30 to 80 phr and even more preferentially from 45 to 65 phr.

Plasticizing Resin

In a manner known to those skilled in the art, the name "plasticizing resin" is reserved in the present application, by definition, for a compound which is, on the one hand, solid at ambient temperature (23° C.) (in contrast to a liquid plasticizing compound, such as an oil) and, on the other hand, compatible (that is to say, miscible at the content used, typically of greater than 5 phr) with the rubber composition for which it is intended, so as to act as a true diluting agent.

Hydrocarbon-based resins are polymers well known to those skilled in the art which are miscible by nature in diene elastomer composition(s), when they are additionally classed as "plasticizing". They have been described, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tire rubber field (5.5. "Rubber Tires and Mechanical Goods"). They may be aliphatic, aromatic or else of the aliphatic/aromatic type, that is to say based on aliphatic and/or aromatic monomers. They may be natural or synthetic and may or may not be based on petroleum (if this is the case, they are also known under the name of petroleum resins). They are preferably exclusively hydrocarbon-based, that is to say that they comprise only carbon and hydrogen atoms.

The glass transition temperature, Tg, is measured in a known way by DSC (Differential Scanning Calorimetry) according to Standard ASTM D3418 (1999). The macrostructure (Mw, Mn and PI) of the hydrocarbon-based resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

It is known practice to use, in rubber compositions for tires, hydrocarbon-based plasticizing resins having at least any one of the following features:
- a Tg of greater than 20° C., more preferentially of greater than 30° C.;
- a number-average molecular weight (Mn) of between 400 and 2000 g/mol;
- a polydispersity index (PI) of less than 4, preferably of less than 3 (as a reminder: PI=Mw/Mn with Mw being the weight-average molecular weight).

More preferentially, this hydrocarbon-based plasticizing resin exhibits all of the above preferred features.

In particular, it is known practice to select these plasticizing resins from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

The applicant has discovered that, among these aromatic dicyclopentadiene plasticizing resins, the dicyclopentadiene resins comprising essentially styrene, ethylene and dicyclopentadiene units, used in compositions based predominantly on SBR and containing carbon black with a CTAB specific surface area of greater than or equal to 90 $m^2/g$, astonishingly made it possible to obtain improved properties.

"Essentially" is understood to mean the fact that the resins comprise at least 80% of units selected from styrene, ethylene and dicyclopentadiene units.

More preferentially still, the aromatic dicyclopentadiene plasticizing resins suitable for the disclosure comprise at least 90% of units selected from styrene, ethylene and dicyclopentadiene units.

By way of examples of resins in accordance with the disclosure, aromatic dicyclopentadiene plasticizing resins having a content of dicyclopentadiene units of between 10 and 30% such as, especially, the commercial resins Novares TC160 (Mn=710 g/mol; Mw=2000 g/mol; PI=2.8, Tg=106° C.) or Novares TC100 (Mn=460 g/mol; Mw=840 g/mol; PI=1.8, Tg=42° C.) sold by the company Rütgers.

The content of aromatic dicyclopentadiene resin preferentially ranges from 2 to 40 phr. Preferentially, the content of aromatic dicyclopentadiene resin ranges from 2 to 20 phr when the rubber composition comprises a content of carbon black, in accordance with the disclosure, of less than or equal to 65 phr, more preferentially the content of plasticizing resin ranges from 4 to 15 phr, and even more preferentially from 5 to 13 phr.

Below the indicated minimum, the targeted technical effect may prove insufficient, whereas above the upper limit, the compromise of properties targeted for the rubber composition in question is no longer achieved.

Crosslinking System

The crosslinking system is preferentially a vulcanization system, that is to say a system based on sulphur (or on a sulphur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the first non-productive phase and/or during the productive phase, as described subsequently.

The sulphur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

Use may be made, as (primary or secondary) accelerator, of any compound capable of acting as accelerator for the vulcanization of diene elastomers in the presence of sulphur, especially accelerators of the thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSP"), zinc dibenzyldithiocarbamate ("ZBEC") and the mixtures of these compounds.

Various Additives

The rubber compositions in accordance with the disclosure may also comprise all or some of the customary additives generally used in elastomer compositions intended for the manufacture of tires, in particular of treads, such as, for example, protective agents such as antiozone waxes, chemical antiozonants, antioxidants, antifatigue agents, tackifying resins, processing aids such as described, for example, in application WO 02/10269, a crosslinking system based either on sulphur or on sulphur donors and/or on peroxide and/or on bismaleimides, vulcanization accelerators or vulcanization activators.

However, the rubber composition in accordance with the disclosure may only comprise a plasticizer other than the aromatic dicyclopentadiene plasticizing resin at a content of less than 5 phr, preferably less than 2 phr, preferentially less than 1 phr.

Even more preferentially, the rubber composition in accordance with the disclosure is devoid of plasticizer other than the aromatic dicyclopentadiene plasticizing resin.

As a function of the targeted application, inert (i.e. non-reinforcing) fillers, such as particles of clay, bentonite, talc, chalk, kaolin, at a content of less than or equal to 10 phr and preferentially less than or equal to 5 phr, may also be added to the reinforcing filler described above.

Manufacture of the Rubber Compositions

The rubber compositions of the disclosure are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

The examples which follow make it possible to illustrate the disclosure; however, the disclosure cannot be limited to these examples alone.

III-1 Preparation of the Rubber Compositions

The following tests are carried out in the following way: the SBR, the carbon black and then, after kneading for one to two minutes, the various other ingredients, especially the plasticizing resin where appropriate, with the exception of the vulcanization system, are introduced into an internal mixer which is 70% filled and the initial vessel temperature of which is approximately 90° C. Thermomechanical working is then carried out (non-productive phase) in one stage (total duration of the kneading equal to approximately 5 min), until a maximum "dropping" temperature of approximately 165° C. is reached. The mixture thus obtained is recovered and cooled and then the covering agent (when the latter is present) and the vulcanization system (sulphur and sulphenamide accelerator) are added on an external mixer (homofinisher) at 70° C., everything being mixed (productive phase) for approximately 5 to 6 min.

The compositions thus obtained are subsequently calendered in the form of slabs (thickness of 2 to 3 mm) of rubber for the measurement of their physical or mechanical properties.

III-2 Test 1

The aim of this test is to demonstrate the improved properties of rubber compositions in accordance with the disclosure compared to compositions not in accordance with the disclosure which are devoid of plasticizing resin or only use plasticizing resins other than aromatic dicyclopentadiene resins.

To this end, 9 compositions based on 100 phr of SBR reinforced with carbon black N134 are compared, these compositions differing from one another essentially by the following technical features:
  composition C1 is a control composition not comprising any plasticizing resin,
  composition C2, not in accordance with the disclosure, comprises 6 phr of a polylimonene plasticizing resin (Tg=72° C.),
  composition C'2, not in accordance with the disclosure, comprises 12 phr of polylimonene resin identical to that of composition C2,
  composition C3, not in accordance with the disclosure, comprises 6 phr of a polylimonene plasticizing resin (Tg=44° C.),
  composition C'3, not in accordance with the disclosure, comprises 12 phr of polylimonene resin identical to that of composition C3,
  composition C4 in accordance with the disclosure comprises 6 phr of an aromatic dicyclopentadiene resin (Tg=106° C.),
  composition C'4 in accordance with the disclosure comprises 12 phr of resin identical to that of composition C4,
  composition C5 in accordance with the disclosure comprises 6 phr of an aromatic dicyclopentadiene resin (Tg=42° C.),
  composition C'5 in accordance with the disclosure comprises 12 phr of resin identical to that of composition C5.

Tables 1 and 2 give the formulations of the various compositions (Table 1—contents of the various products, expressed in phr) and their properties after curing for approximately 40 min at 150° C. (Table 2); the vulcanization system consists of sulphur and sulphenamide.

In light of Table 2, it is clearly apparent that all the compositions containing a plasticizing resin make it possible to improve the limit properties of compositions (tearability or break) compared to the control composition C1.

However, it is apparent, astonishingly, that the compositions in accordance with the invention C4 and C5 enable a very significantly greater improvement compared to compositions C2 and C3:
  increase in the breaking energy of the order of 20-22% for compositions C2 and C3 compared to composition C1, and increase of 30-35% for compositions C4 and C5 in accordance with the invention compared to composition C1;
  increase in the energy of the order of 23% for compositions C2 and C3 compared to composition C1, and increase of 50% for compositions C4 and C5 in accordance with the disclosure compared to composition C1;

This difference is even more pronounced for the breaking energy and energy for the compositions C' (including 12 phr of resin).

This effect is all the more surprising since it is not possible to make a connection with the Tg of these various resins, but solely with their chemical structure.

III-3 Test 2

The aim of this test is to demonstrate the improved properties of rubber compositions in accordance with the invention compared to compositions not in accordance with the invention which are devoid of plasticizing resin or only use plasticizing resins other than aromatic dicyclopentadiene resins, with another carbon black with a CTAB specific surface area of greater than or equal to 90 m²/g, from a separate grade to test 1.

The 9 compositions of this test differ essentially by the following technical features:

To this end, 9 compositions based on 100 phr of SBR reinforced with carbon black N234 are compared, these compositions differing from one another essentially by the following technical features:
  composition C6 is a control composition not comprising any plasticizing resin,
  composition C7, not in accordance with the disclosure, comprises 6 phr of a polylimonene plasticizing resin (Tg=72° C.),
  composition C'7, not in accordance with the disclosure, comprises 12 phr of polylimonene resin identical to that of composition C7,
  composition C8, not in accordance with the disclosure, comprises 6 phr of a polylimonene plasticizing resin (Tg=44° C.),
  composition C'8, not in accordance with the disclosure, comprises 12 phr of polylimonene resin identical to that of composition C8,
  composition C9 in accordance with the disclosure comprises 6 phr of an aromatic dicyclopentadiene resin (Tg=106° C.),
  composition C'9 in accordance with the disclosure comprises 12 phr of resin identical to that of composition C9,
  composition C10 in accordance with the disclosure comprises 6 phr of an aromatic dicyclopentadiene resin (Tg=42° C.),
  composition C'10 in accordance with the disclosure comprises 12 phr of resin identical to that of composition C10.

Tables 3 and 4 give the formulations of the various compositions (Table 3—contents of the various products, expressed in phr) and their properties after curing for approximately 40 min at 150° C. (Table 4); the vulcanization system consists of sulphur and sulphenamide.

In light of Table 4, the same phenomenon is observed as that observed in test 1 with a carbon black of a different grade.

Thus, these examples show that the use, in a rubber composition, of fine reinforcing fillers, carbon black with a CTAB specific surface area of greater than or equal to 90 m²/g, combined with a specific type of plasticizing resin, aromatic dicyclopentadiene plasticizing resin, made it possible to significantly and surprisingly improve the limit properties of these compositions.

TABLE 1

| | Compositions | | | | | | | | |
|---|---|---|---|---|---|---|---|---|---|
| | C1 | C2 | C'2 | C3 | C'3 | C4 | C'4 | C5 | C'5 |
| SBR (1) | 100 | 100 | 100 | 100 | 100 | 100 | 100 | 100 | 100 |
| Carbon black (2) | 55 | 55 | 55 | 55 | 55 | 55 | 55 | 55 | 55 |
| Plasticizing resin (3) | — | 6 | 12 | — | — | — | — | — | — |
| Plasticizing resin (4) | — | — | — | 6 | 12 | — | — | — | — |
| Plasticizing resin (5) | — | — | — | — | — | 6 | 12 | — | — |
| Plasticizing resin (6) | — | — | — | — | — | — | — | 6 | 12 |
| Antioxidant (7) | 1.5 | 1.5 | 1.5 | 1.5 | 1.5 | 1.5 | 1.5 | 1.5 | 1.5 |
| Zinc oxide (8) | 2 | 2 | 2 | 2 | 2 | 2 | 2 | 2 | 2 |
| Stearic acid (9) | 0.5 | 0.5 | 0.5 | 0.5 | 0.5 | 0.5 | 0.5 | 0.5 | 0.5 |
| Sulphur | 1.3 | 1.3 | 1.3 | 1.3 | 1.3 | 1.3 | 1.3 | 1.3 | 1.3 |
| Accelerator (10) | 1.3 | 1.3 | 1.3 | 1.3 | 1.3 | 1.3 | 1.3 | 1.3 | 1.3 |

(1) SSBR with 25% of styrene, 27% of 1,2-polybutadiene units and 48% of trans-1,4-polybutadiene units (Tg = −48° C.); content expressed as dry SBR (SBR extended with 9% of MES oil, i.e. a total of SSBR + oil equal to 76 phr);
(2) N134, sold by Cabot Corporation (CTAB 130 m²/g);
(3) SYLVARES 7125 polylimonene resin (Tg = 72° C., softening point = 120° C.) sold by Arizona;
(4) Polylimonene resin (Resine THER 8644 from Cray Valley);
(5) Novares TC160 resin (Mn = 710 g/mol; Mw = 2000 g/mol; PI = 2.8, Tg = 106° C.) sold by Rutgers;
(6) Novares TC100 resin (Mn = 460 g/mol; Mw = 840 g/mol; PI = 1.8, Tg = 42° C.) sold by Rutgers;
(7) N-(1,3-Dimethylbutyl)-N-phenyl-para-phenylenediamine (Santoflex 6-PPD from Flexsys);
(8) Zinc oxide (industrial grade - Umicore);
(9) Stearin (Pristerene 4931 - Uniqema);
(10) N-Cyclohexyl-2-benzothiazolesulphenamide (Santocure CBS from Flexsys).

TABLE 2

| | Compositions | | | | | | | | |
|---|---|---|---|---|---|---|---|---|---|
| | C1 | C2 | C'2 | C3 | C'3 | C4 | C'4 | C5 | C'5 |
| Elongation at break (%) | 419 | 513 | 579 | 506 | 565 | 542 | 710 | 566 | 784 |
| Breaking stress (MPa) | 14 | 13 | 13 | 13 | 12 | 13 | 11 | 13 | 12 |
| Breaking energy | 57 | 68 | 74 | 64 | 66 | 70 | 81 | 71 | 90 |
| DRD (%) | 199 | 248 | 264 | 251 | 284 | 283 | 502 | 293 | 465 |
| FRD (N/mm) | 47.0 | 46.3 | 41.4 | 46.0 | 42.8 | 50.1 | 61.7 | 47.6 | 51.7 |
| Energy | 93 | 115 | 109 | 115 | 122 | 142 | 310 | 139 | 240 |

TABLE 3

| | Compositions | | | | | | | | |
|---|---|---|---|---|---|---|---|---|---|
| | C6 | C7 | C'7 | C8 | C'8 | C9 | C'9 | C10 | C'10 |
| SBR (1) | 100 | 100 | 100 | 100 | 100 | 100 | 100 | 100 | 100 |
| Carbon black (11) | 55 | 55 | 55 | 55 | 55 | 55 | 55 | 55 | 55 |
| Plasticizing resin (3) | — | 6 | 12 | — | — | — | — | — | — |
| Plasticizing resin (4) | — | — | — | 6 | 12 | — | — | — | — |
| Plasticizing resin (5) | — | — | — | — | — | 6 | 12 | — | — |
| Plasticizing resin (6) | — | — | — | — | — | — | — | 6 | 12 |
| Antioxidant (7) | 1.5 | 1.5 | 1.5 | 1.5 | 1.5 | 1.5 | 1.5 | 1.5 | 1.5 |
| Zinc oxide (8) | 2 | 2 | 2 | 2 | 2 | 2 | 2 | 2 | 2 |
| Stearic acid (9) | 0.5 | 0.5 | 0.5 | 0.5 | 0.5 | 0.5 | 0.5 | 0.5 | 0.5 |
| Sulphur | 1.3 | 1.3 | 1.3 | 1.3 | 1.3 | 1.3 | 1.3 | 1.3 | 1.3 |
| Accelerator (10) | 1.3 | 1.3 | 1.3 | 1.3 | 1.3 | 1.3 | 1.3 | 1.3 | 1.3 |

(11) N234, sold by Cabot Corporation (CTAB 115 m²/g)

TABLE 4

| | Compositions | | | | | | | | |
|---|---|---|---|---|---|---|---|---|---|
| | C6 | C7 | C'7 | C8 | C'8 | C9 | C'9 | C10 | C'10 |
| Elongation at break (%) | 417 | 518 | 575 | 488 | 565 | 619 | 778 | 595 | 769 |
| Breaking stress (MPa) | 14 | 14 | 12 | 13 | 12 | 13 | 12 | 13 | 12 |
| Breaking energy | 58 | 70 | 70 | 63 | 67 | 82 | 92 | 79 | 92 |
| DRD (%) | 210 | 263 | 272 | 240 | 279 | 294 | 499 | 289 | 449 |
| FRD (N/mm) | 53.3 | 54.3 | 45.4 | 48.2 | 44.7 | 50.1 | 57.9 | 50.9 | 57.4 |
| Energy | 112 | 143 | 124 | 116 | 125 | 147 | 289 | 147 | 258 |

What is claimed is:

1. A rubber composition based on at least one styrene/butadiene copolymer SBR, the SBR having a content of greater than or equal to 50 parts per hundred parts of elastomer, phr, a reinforcing filler comprising carbon black with a CTAB specific surface area of greater than or equal to 90 m²/g, wherein the composition comprises an aromatic dicyclopentadiene plasticizing resin comprising at least 80% by weight of units selected from each of styrene, ethylene and dicyclopentadiene units, at a content ranging from 2 to 40 phr, the composition containing less than 5 phr of another plasticizer.

2. The composition according to claim 1, in which the SBR content ranges from 60 to 100 phr.

3. The composition according to claim 2, in which the SBR content ranges from 80 phr to 100 phr.

4. The composition according to claim 1, in which the SBR is present in a blend with at least one other diene elastomer.

5. The composition according to claim 4, in which the other diene elastomer is selected from the group consisting of polybutadienes, synthetic polyisoprenes, natural rubber, butadiene copolymers, isoprene copolymers and the mixtures of these elastomers.

6. The composition according to claim 1, in which the SBR is present in a blend with natural rubber or synthetic polyisoprene, present at a content ranging from 1 to 40 phr.

7. The composition according to claim 6, in which the content of natural rubber or of synthetic polyisoprene ranges from 5 to 25 phr.

8. The composition according to claim 1, in which the carbon black represents more than 60% by weight of the sum total of reinforcing filler.

9. The composition according to claim 8, in which the carbon black represents more than 90% by weight of the sum total of reinforcing filler.

10. The composition according to claim 9, in which the carbon black is the only reinforcing filler.

11. The composition according to any one of the preceding claims, in which the total content of reinforcing filler ranges from 20 to 90 phr.

12. The composition according to claim 10, in which the total content of reinforcing filler ranges from 30 to 80 phr.

13. The composition according to any one of the preceding claims, in which the aromatic dicyclopentadiene plasticizing resin comprises at least 90% by weight of units selected from each of styrene, ethylene and dicyclopentadiene units.

14. The composition according to claim 1, wherein the composition is devoid of plasticizer other than the aromatic dicyclopentadiene plasticizing resin.

15. The composition according to claim 1, in which the content of carbon black is less than or equal to 65 phr, and the content of aromatic dicyclopentadiene resin ranges from 2 to 20 phr.

16. The composition according to claim 15, in which the content of plasticizing resin ranges from 4 to 15 phr.

17. A tire comprising a rubber composition according to claim 1.

18. A tire tread comprising a rubber composition according to claim 1.

19. The composition according to claim 12, in which the total content of reinforcing filler ranges from 45 to 65 phr.

20. The composition according to claim 16, in which the content of plasticizing resin ranges from 5 to 13 phr.

* * * * *